United States Patent [19]

Spacher et al.

[11] Patent Number: 5,034,610

[45] Date of Patent: Jul. 23, 1991

[54] MOBILE RADIATION MONITOR

[76] Inventors: Paul F. Spacher; Mark Spacher, both of 40 North Ave.; Peter J. Spacher, 119 Mill Rd., all of Rochester, N.Y. 14626

[21] Appl. No.: 531,568

[22] Filed: Jun. 1, 1990

[51] Int. Cl.$^5$ .............................................. G01T 1/203
[52] U.S. Cl. ............................ 250/363.01; 250/361 R
[58] Field of Search .......... 250/361 R, 363.01, 363.02, 250/366, 367, 369

[56] References Cited

U.S. PATENT DOCUMENTS

| | | | |
|---|---|---|---|
| 4,352,019 | 9/1982 | Pollard | 250/366 |
| 4,509,042 | 4/1985 | Kruse | 250/361 R |
| 4,598,202 | 7/1986 | Koechner | 250/368 |
| 4,760,260 | 7/1988 | Walsh et al. | 250/363.02 |

Primary Examiner—Carolyn E. Fields
Attorney, Agent, or Firm—Robert J. Bird

[57] ABSTRACT

A mobile radiation monitor includes a radiation detector unit and a signal analyzer connected to it. The radiation detector unit includes a base, a flat pad radiation scintillation detector on the base, and a bridging platform connected to the base and extending over the radiation scintillation detector to provide a walkway over it. Radiation from a subject on the bridging platform, producing an effect in the scintillator, is monitored at the signal analyzer. The radiation detector unit includes handles for mobility and anti-slip pads for safety.

2 Claims, 2 Drawing Sheets

MOBILE RADIATION MONITOR

FIELD OF THE INVENTION

This invention relates to the measurement of radiation exposure, and more particularly to equipment for measuring and monitoring radiation doses to which humans have been exposed. The invention was not conceived or made in the course of, or in connection with, or under the terms of any contract, subcontract or arrangement entered into with or for the benefit of the United State Atomic Energy Commission or its successors: Energy Research and Development Administration and the Department of Energy.

BACKGROUND INFORMATION

In the prior art there are generally two kinds of radiation monitors in general use. One of these is a system usually including a stationary frame resembling a doorway through which persons walk. The "doorway" frame is instrumented around its periphery, up one side and down the other, and the instrumentation connected to a convenient readout or display. This system is relatively heavy and bulky, and not readily mobile to a point of need. It therefore remains in place as a stationary unit, and users must go to it. It is also not generally accessible to the handicapped because of the limiting doorway configuration.

The other kind of monitor in general use is a hand held "wand" which an operator moves up and down, front and back, to scan the subject person. The disadvantage of this kind of monitor is that, in addition to the required reading and recording of data, the wand itself requires manual operation or manipulation by an operator. It is slow and painstaking and therefore not suitable for measuring radiation exposures of large numbers of people.

SUMMARY OF THE INVENTION

In summary, the present invention is a mobile radiation monitor including a radiation detector unit and a signal analyzer operatively connected to it. The radiation detector unit includes a base, a flat pad radiation scintillation detector on the base, and a bridging platform connected to the base and extending over the radiation scintillation detector to provide a walkway over it. Radiation from a subject on the bridging platform, producing an effect in the scintillator, is monitored at the signal analyzer.

DRAWING

DESCRIPTION

Figure 1:
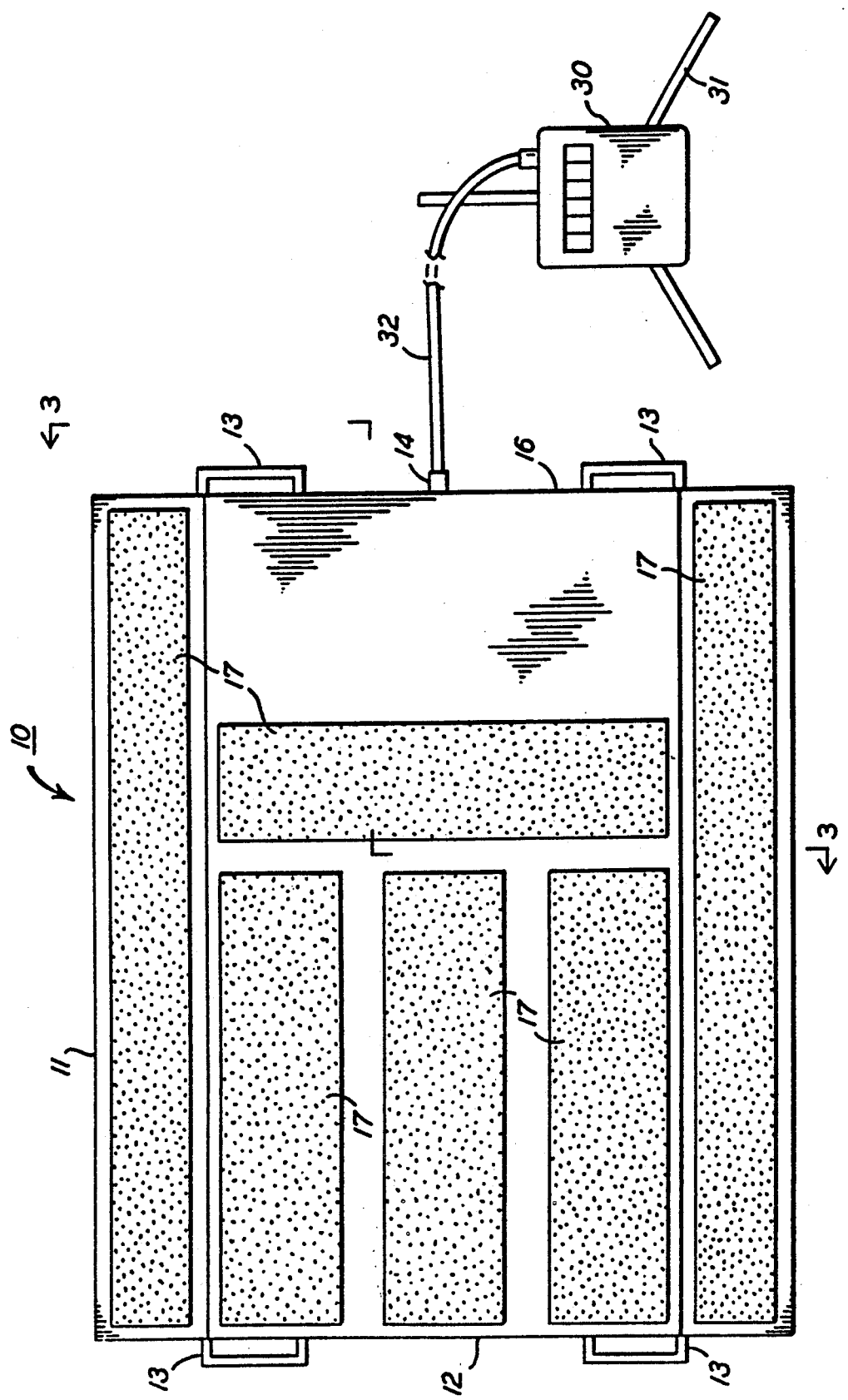
FIG. 1 is a plan view of a radiation monitor of this invention.

The mobile radiation monitor of this invention includes a radiation detector unit 10 and a signal analyzer 30. The detector unit 10 includes a base 11 with a vertical end wall or stop 12 at one end, a pair of angled stop members 15 at the other end, handles 13, and a coaxial cable connector 14. A bridging platform 16 is connected to the base 11 and extends over it. The platform 16 includes a number of anti slip pads 17.

Figure 2:
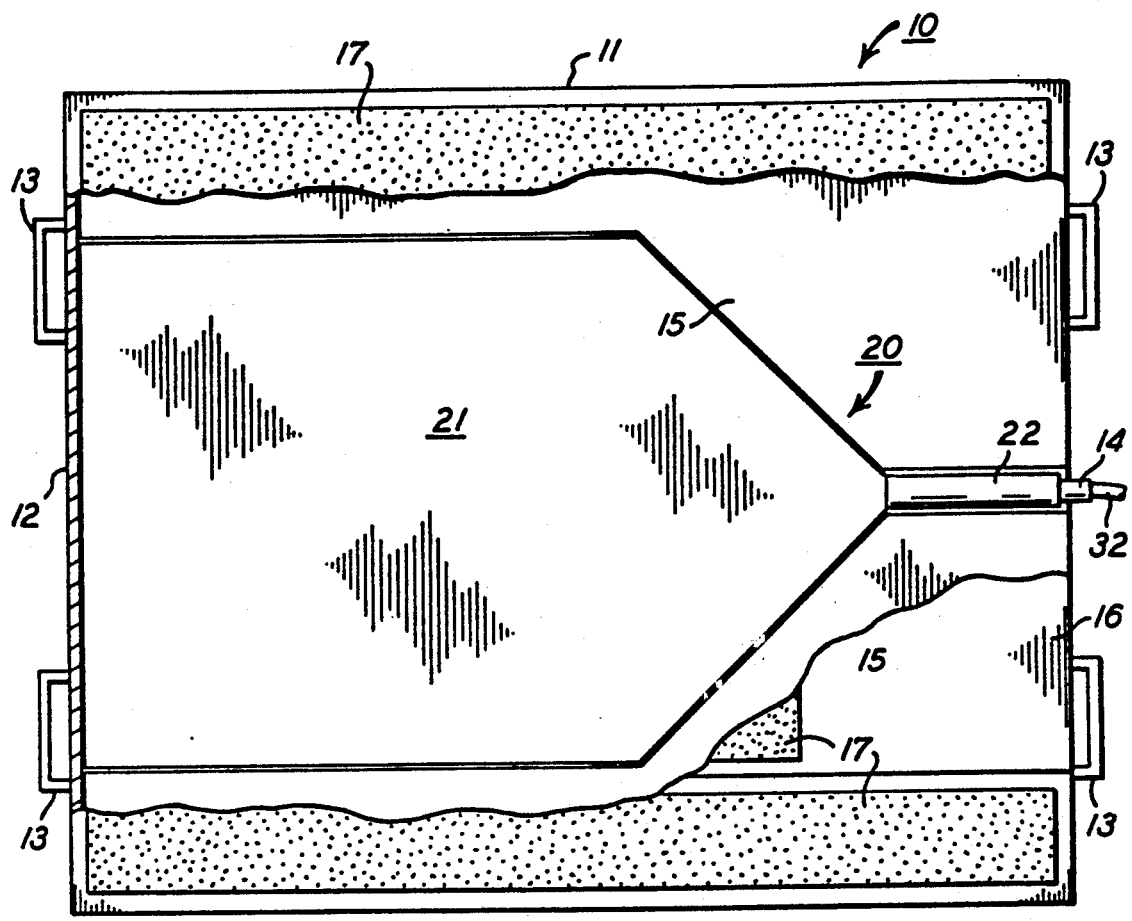
FIG. 2 is a plan view of the same monitor without its bridging platform.
Figure 4:
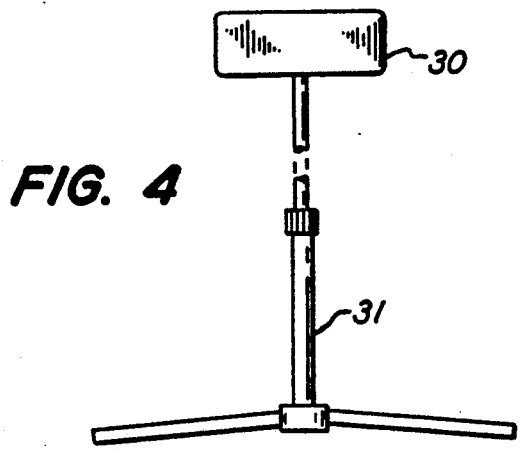
FIG. 4 is an elevation view of the signal analyzer.
Figure 3:
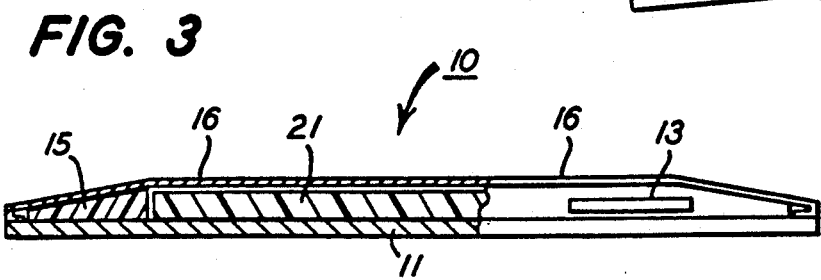
FIG. 3 is a partial sectional view taken along the line 3—3 of FIG. 1.

A radiation scintillation detector 20 (FIGS. 2 and 3) lies on the base 11 between the end stop 12 and the angled stop members 15. The detector 20 includes a scintillator 21 and a photomultiplier tube 22. A scintillator is a radiation detector that responds to radiation by emitting flashes of visible light, for counting alpha, beta, and gamma radiation. The scintillator 21 is a flat pad of plastic material doped with a scintillation material. It lies on the base 11, centered and held in place by the angled stop members 15. It is wired to the coaxial cable connector 14. The bridging platform 16 provides a walkway over the radiation scintillation detector 20.

The signal analyzer 30 is mounted on a folding stand 31, and connected to the cable connector 14 by a coaxial cable 32. A signal analyzer is a device that provides a quantitative response to a prescribed number of input pulses. The signal analyzer 30 is typical of those known to the prior art.

In operation, a subject person mounts the bridging platform 16, on foot or by wheelchair or by being carried, and remains on the bridging platform until the test is completed. Radiation from the subject person produces the measurable effect described above. This effect is then monitored or recorded at the signal analyzer 30 in a well known manner.

The system is lightweight and easily mobile, and requires no set up time. It contains its own power supply in the signal analyzer. It meets Federal Emergency Management Agency and Nuclear Regulatory Commission specifications which require cognizant governmental agencies to provide equipment for timely monitoring of subjects at evacuee reception centers. The system does not limit the size and shape of the subject to be monitored, because there is no doorway.

The foregoing description of a preferred embodiment of this invention is intended as illustrative. The concept and scope of the invention are limited only by the following claims and equivalents thereof.

What is claimed is:

1. A mobile radiation monitor including a radiation detector unit and a signal analyzer operatively connected thereto;

said radiation detector unit including a base, a radiation scintillation detector disposed on said base, and bridging platform connected to said base and extending over said radiation scintillation detector to provide a walkway over said radiation scintillation detector; said radiation scintillation detector including a scintillator and a photomultiplier tube; said scintillator including a pad of plastic material doped with a scintillation material and lying flat on said base;

whereby radiation from a subject atop said bridging platform produces an effect in said scintillator and is monitored at said signal analyzer.

2. A mobile radiation monitor as defined in claim 1, further including a handle to carry said radiation detector, and an anti slip pad on said bridging platform.

* * * * *